United States Patent [19]
West et al.

[11] Patent Number: 5,355,619
[45] Date of Patent: Oct. 18, 1994

[54] TREE INJECTOR SYSTEM

[76] Inventors: Otho S. West, 4405 Old Government Rd.; Gary E. Hale, 4210 Lake Hancock Rd., both of, Lakeland, Fla. 33811

[21] Appl. No.: 129,492

[22] Filed: Sep. 30, 1993

Related U.S. Application Data

[63] Continuation of Ser. No. 681,718, Apr. 8, 1991.

[51] Int. Cl.$^5$ ............................................. A01G 29/00
[52] U.S. Cl. ....................................... 47/57.5; 47/48.5
[58] Field of Search ................................ 47/48.5, 57.5

[56] References Cited

U.S. PATENT DOCUMENTS

| | | | |
|---|---|---|---|
| 2,258,693 | 10/1941 | Van Yahres | 47/57.5 |
| 2,820,671 | 1/1958 | McFarland | 47/48.5 |
| 3,992,813 | 11/1976 | Freshel | 47/57.5 |
| 4,112,617 | 9/1978 | Purviance | 47/57.5 |
| 4,144,673 | 3/1979 | Quast et al. | 47/57.5 |
| 4,908,983 | 3/1990 | Mazur et al. | 47/57.5 |

FOREIGN PATENT DOCUMENTS

| | | | |
|---|---|---|---|
| 802412 | 2/1951 | Fed. Rep. of Germany | 47/57.5 |
| 2509123 | 1/1983 | France | 47/57.5 |
| 1420810 | 1/1976 | United Kingdom | 47/57.5 |

*Primary Examiner*—Ramon S. Britts
*Assistant Examiner*—Joanne C. Downs

[57] ABSTRACT

An apparatus and method is disclosed for injecting a treatment liquid into a hole drilled into a trunk of a tree comprising a container for receiving the treatment liquid and a closure for closing the container. A one-way valve means enables a pressurized gas to be introduced into container. A control valve controls the flow of liquid from the container into a flexible tubing. The flexible tubing has an injector nozzle for insertion into the hole in the trunk of the tree for enabling the pressurized gas to force the treatment liquid into the hole in the tree to administer the treatment liquid thereby.

1 Claim, 5 Drawing Sheets

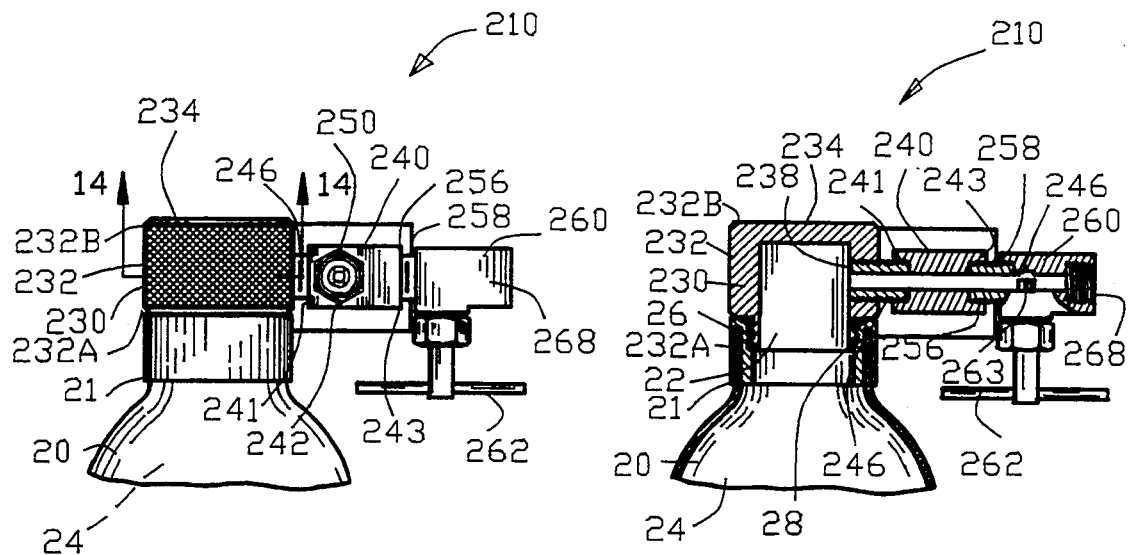
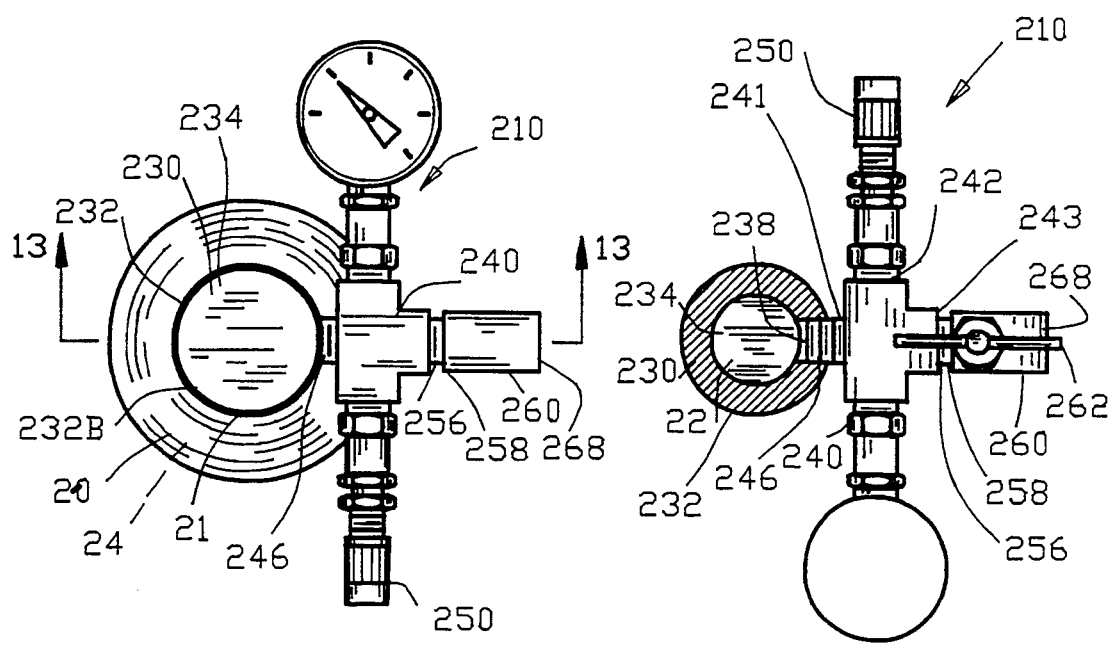

TREE INJECTOR SYSTEM

This application is a continuation of patent application Ser. No. 07/681,718 filed Apr. 8, 1991, the disclosure of which is incorporated herein by reference.

BACKGROUND OF THE INVENTION

1. Field Of The Invention

This invention relates to plant treatment and care and more particularly to an improved system for injecting a treatment liquid into a hole drilled into a trunk of a tree.

2. Information Disclosure Statement

For many years, it has been well in the art that the growth and/or health of plant life many be enhanced by the administering of fertilizer substances, chemical nutriment substances or medicine substances. In general, these substances are administered to the ground proximate the trunk or stem of the plant life. The administration of fertilizer, chemical and medicine substances to the ground have several disadvantages which has prompted the use of other methods of administration.

When the fertilizer, chemical and medicine substances are administered to the ground, only a portion of these substances are absorbed by the plant life. In addition, some of the substances may be washed away by water prior to entering the ground. The washing away of the fertilizer, chemical and medicine substances not only reduces the amount of material entering the ground but also allows the fertilizer, chemical and medicine substances to enter other ecological systems. Depending on the ecological systems involved, the entry of the fertilizer, chemical and medicine substances into another ecological system may result in undesired side effects and/or undesired contamination by the fertilizer, chemical and medicine substances.

To overcome these disadvantages, the prior art has developed the method of introducing the fertilizer, chemical and medicine substances directly into the plant life. In the case of tree plant life, holes are drilled into the trunk of a tree and the fertilizer, chemical and medicine substances are directly introduced into the trunk of the tree. In general, the introduction of the fertilizer, chemical and medicine substances into the trunk of the tree must be accomplished under pressure to overcome an internal pressure within the tree caused by the tree sap.

Various types of devices have been used by the prior art for introducing fertilizer, chemical and medicine substances into the trunk under pressure. Many in the prior art have used a flexible tubing having a plurality of injector nozzles for insertion into a plurality of holes in a tree. In one instance, the flexible tube was connected to an elevated container for enabling the force of gravity to provide the pressure to inject the substance directly into the trunk of the tree. Unfortunately, the force of gravity was not allows sufficient to provide the pressure to inject the substance directly into the trunk of the tree. In another instance, the flexible tube was connected to a container which is pressurized by an air compressor. Although the air compressor provided sufficient pressure to inject the substance directly into the trunk of the tree, the air compressor required and external power supply for powering the compressor. In addition, the noise produced by the air compressor was sometimes objectionable.

Others in the prior art have used a conventional spray container having a manual pump for providing the pressure to inject the substance directly into the trunk of the tree. In general, conventional spray containers incorporating a manual pump are too bulky and too expensive for use in a large scale operation.

One prior art device used a disposable container having a self contained manual pump for providing the pressure to inject the substance directly into the trunk of the tree. Although this prior art device has found widespread use in the art, the device was able to inject the substance directly into a single hole in the trunk of a tree. Accordingly, a plurality of these devices was required for a typical tree.

Therefore, it is an object of the present invention to provide an improved system for injecting a treatment liquid into a hole drilled into a trunk of a tree which overcomes the inadequacies of the prior art injection systems.

Another object of this invention is to provide an improved system for injecting a treatment liquid into a hole drilled into a trunk of a tree incorporating a pressurized container which is portable, low cost to purchase and is easy to use.

Another object of this invention is to provide an improved system for injecting a treatment liquid into a hole drilled into a trunk of a tree incorporating a pressurized container which is refillable for low cost operation.

Another object of this invention is to provide an improved system for injecting a treatment liquid into a hole drilled into a trunk of a tree incorporating a pressurized container which is refillable and may be easily pressurize without specialized equipment.

Another object of this invention is to provide an improved system for injecting a treatment liquid into a hole drilled into a trunk of a tree which provides a reliable dosage of the treatment liquid to the tree.

Another object of this invention is to provide an improved system for injecting a treatment liquid into a hole drilled into a trunk of a tree which is capable of delivering a large or small dosage as well as large or small dosage rates.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved tree injection system for injecting a treatment liquid into hole means drilled into a trunk of a tree. The improved tree injection system comprises a container having an opening for filling an interior of the container with the treatment liquid. A closure is secured to the container for closing the opening in the container. A one-way valve means communicates with the interior of the container for enabling a pressurized gas to be introduced into the interior of the container. A control valve means communicates with the interior of the container for controlling the flow of liquid from the interior of the container. A flexible tubing has an injector nozzle for insertion into the hole means in the tree. The flexible tubing is connected to the control valve means for enabling the pressurized gas within the interior of the container to force the treatment liquid into the hole means in the tree to administer the treatment liquid in the tree.

In a more specific embodiment of the invention, the container opening includes container threads and the closure has closure threads for threadably engaging with the container treads for removably securing the closure to the container for enabling the container to be refilled with the treatment liquid.

Preferably, the one-way valve means is disposed in the closure for communicating with the interior of the container when the closure is secured to the container. In one embodiment of the invention, the one-way valve means is adapted to receive the pressurized gas, from a conventional tire filling adaptor to introduce the pressurized gas into the interior of the container. In this embodiment of the invention, the control valve means is also disposed in the closure for communicating with the interior of the container when the closure is secured to the container. The one-way valve means and the control valve means may communicate with the interior of the container through a common closure aperture located in the closure.

In the preferred embodiment of the invention, the injector nozzle of the flexible tubing is substantially rigid with the injector nozzle including a tapered serration for facilitating the insertion of the injector nozzle into the hole means in the tree and for inhibiting the removal of the injector nozzle from the hole means in the tree. The flexible tubing may include a plurality of injector nozzles for insertion within a plurality of the hole means in the tree.

An optional spray valve may be disposed in the closure for communicating with the interior of the container when the closure is secured to the container with a spray actuator having a terminal orifice being secured to the spray valve for enabling the pressurized gas within the interior of the container to spray the treatment liquid from the terminal orifice upon actuation of the spray actuator.

The invention is also incorporated into the method of administering a treatment liquid into a tree by injecting the treatment liquid into a plurality of holes drilled into a trunk of a tree. The method comprises the steps of filling a container with the treatment liquid and closing the opening in the container with a closure having a control valve means disposed therein. A pressurized gas is introduced into the container to place the treatment liquid under fluid pressure within the container. A flexible tubing having a plurality of injector nozzles is connected to the control valve and the plurality of injector nozzles are inserted into the plurality of holes in the tree. The container and the closure are inverted for positioning the treatment liquid adjacent to the control valve and the control valve is opened for enabling the pressurized gas within the container to force the treatment liquid into the plurality of holes in the tree to administer the treatment liquid to the tree.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 11 is an enlarged view of a portion of FIG. 9;

FIG. 12 is a top view of FIG. 11;

FIG. 13 is a sectional view along line 13—13 in FIG. 12; and

FIG. 14 is a sectional view along line 14—14 in FIG. 11.

Similar reference characters refer to similar parts throughout the several Figures of the drawings.

DETAILED DISCUSSION

Figure 1:
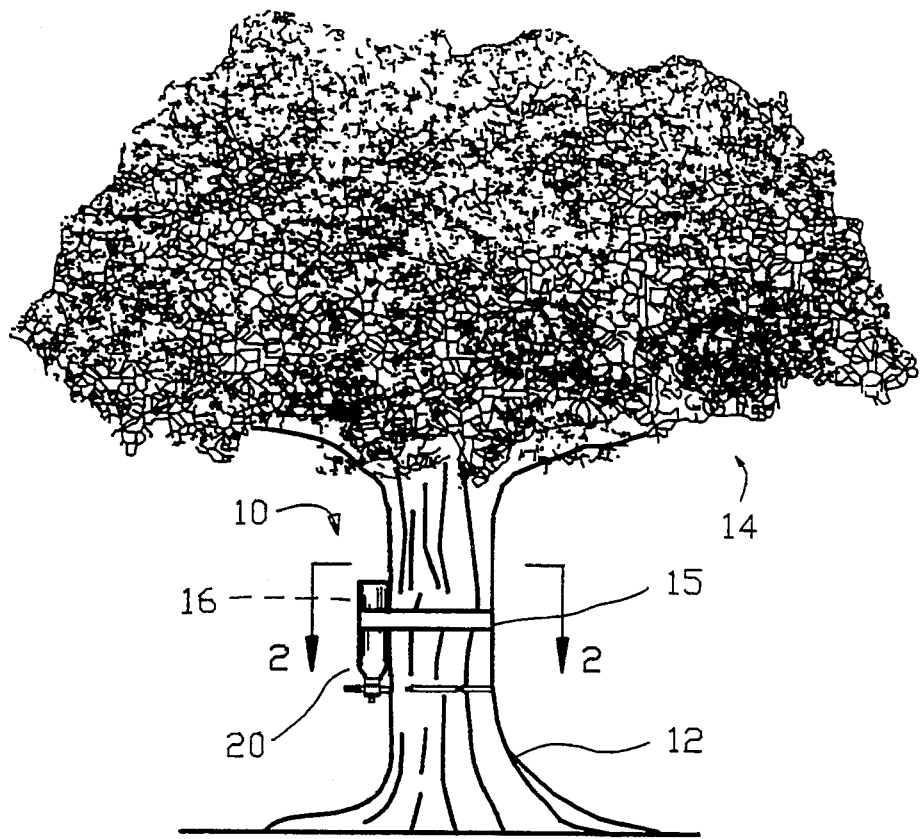
FIG. 1 is an elevational view of a first embodiment of the improved tree injection system of the present invention installed on a tree.

FIG. 1 is an elevational view of a first embodiment of the improved tree injection system 10 of the present invention secured to a trunk 12 of a tree 14 by a fastener 15. As shown in the enlarged sectional view of FIG. 2, the improved tree injection system 10 provides means for injecting a treatment liquid 16 into hole means 18 shown as holes 18A–18G drilled into the trunk 12 of the tree 14.

Figure 7:
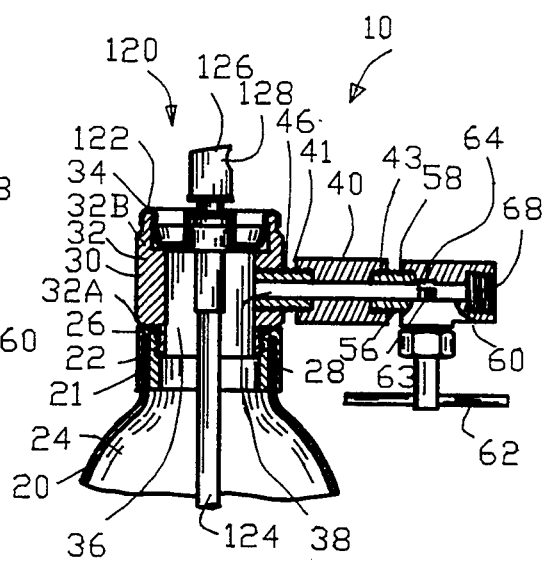
FIG. 7 is a sectional view along line 7—7 in FIG. 6.
Figure 6:
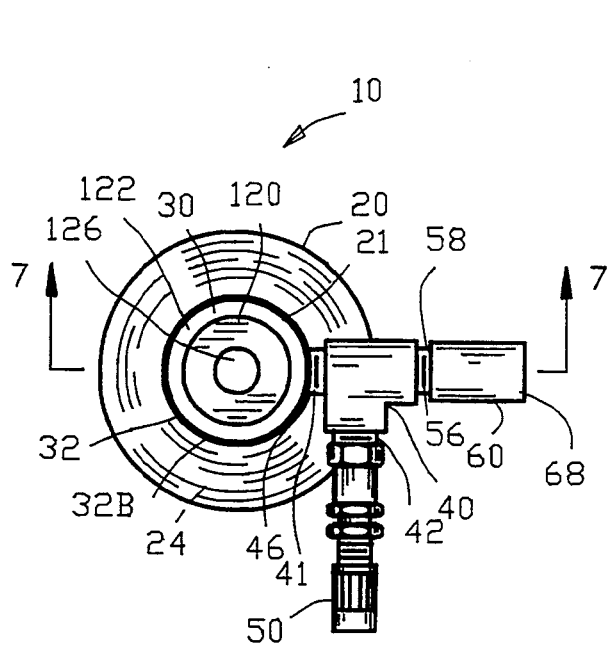
FIG. 6 is a top view of FIG. 5.
Figure 8:
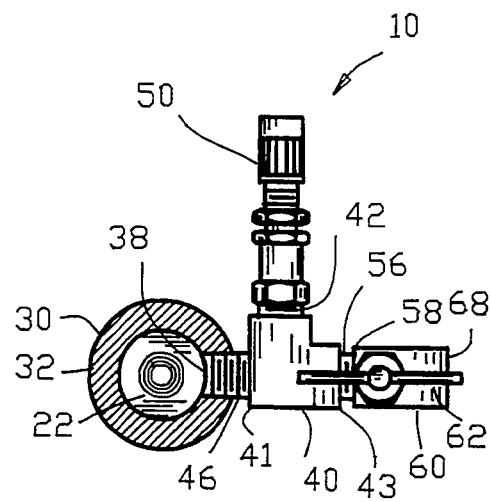
FIG. 8 is a sectional view along line 8—8 in FIG. 7.
Figure 9:
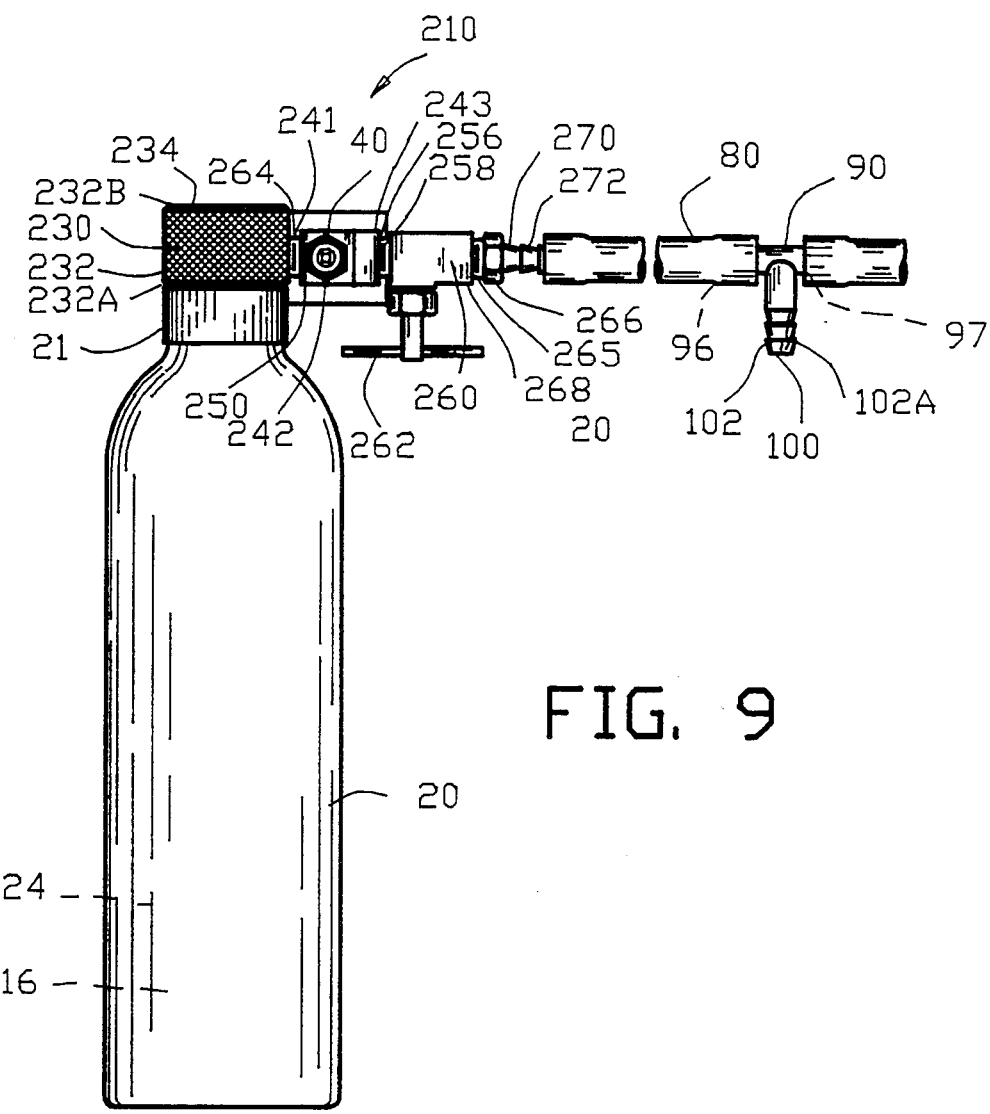
FIG. 9 is an enlarged elevational view of a second embodiment of the improved tree injection system of the present invention.
Figure 10:
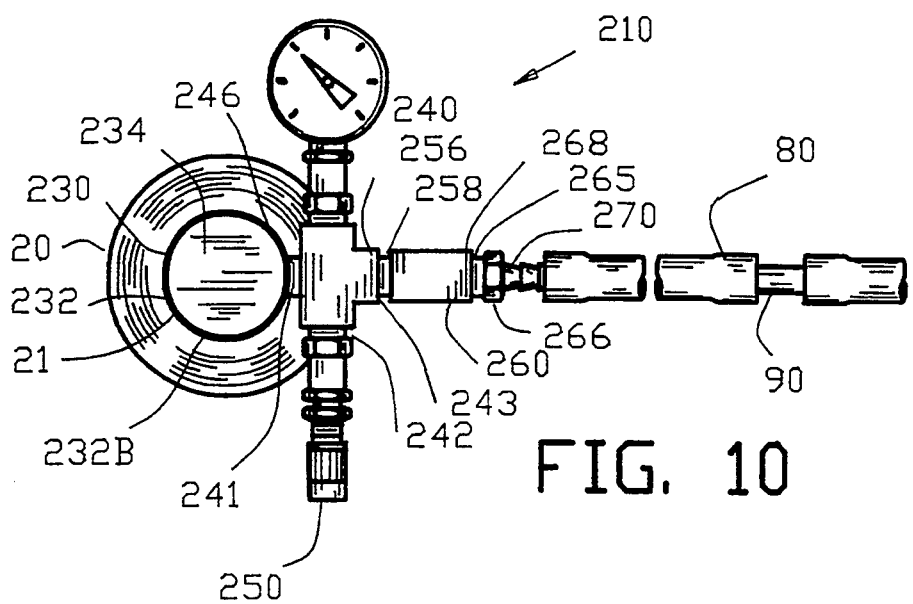
FIG. 10 is a top view of FIG. 9.

As further shown with reference to FIGS. 3-8, the improved tree injection system 10 comprises a container 20 shown as a seamless aluminum container having a mounting 21 secured to the container 20 by swaging, compression fitting or other means well known to the art. As best shown in FIG. 7, the mounting 21 defines a container opening 22 for filling an interior 24 of the container 20 with the treatment liquid 16. The mounting 21 includes container threads 26 for threadably engaging with closure threads 28 of a closure 30 for closing the container opening 22 in the container 20. The container threads 26 and the closure threads 28 enable the closure 30 to be removably secured to the container 20 enabling the container 20 to be refilled with the treatment liquid 16.

The closure 30 comprises a cylindrical sidewall 32 with the closure threads 28 being disposed on a lower end 32A of the cylindrical sidewall 32 and with an annular bead 34 being disposed on an upper end 32B of the cylindrical sidewall 32. The cylindrical sidewall 32 of the closure 30 defines a cylindrical internal volume 36 and a threaded closure aperture 38.

A coupling 40 includes a first, second and a third threaded aperture 41, 42 and 43 which are in fluid communication internal the coupling 40. The first threaded aperture 41 is connected by an inner threaded nipple 46 to the threaded aperture 38 of the closure 30.

A one-way valve means 50 is threadably connected to the second threaded aperture 42 of the coupling 40. The one-way valve means 50 is shown as a conventional Schrader valve commonly used to inflate automobile and bicycle tires or the like. The one-way valve means 50 communicates with the interior 24 of the container 20 through the coupling 40, the inner threaded nipple 46 and the cylindrical internal volume 36 of the closure 30. The one-way valve means 50 enables a pressurized gas such as air to be introduced into the interior 24 of the container 20 through the use of a conventional tire inflation pump or compressor (not shown). It should be appreciated that other compressed gases or liquid propellants may be used with the present invention.

An intermediate threaded nipple 56 interconnects the third threaded aperture 43 of the coupling 40 to an input bore 58 of a control valve means 60. The control valve means 60 is shown as a metering valve having a rotatable handle 62 for metering or controlling the flow of fluid therethrough. The control valve means 60 communicates with the interior 24 of the container 20 for controlling the flow of the treatment liquid 16 from the interior 24 of the container 20.

Figure 2:
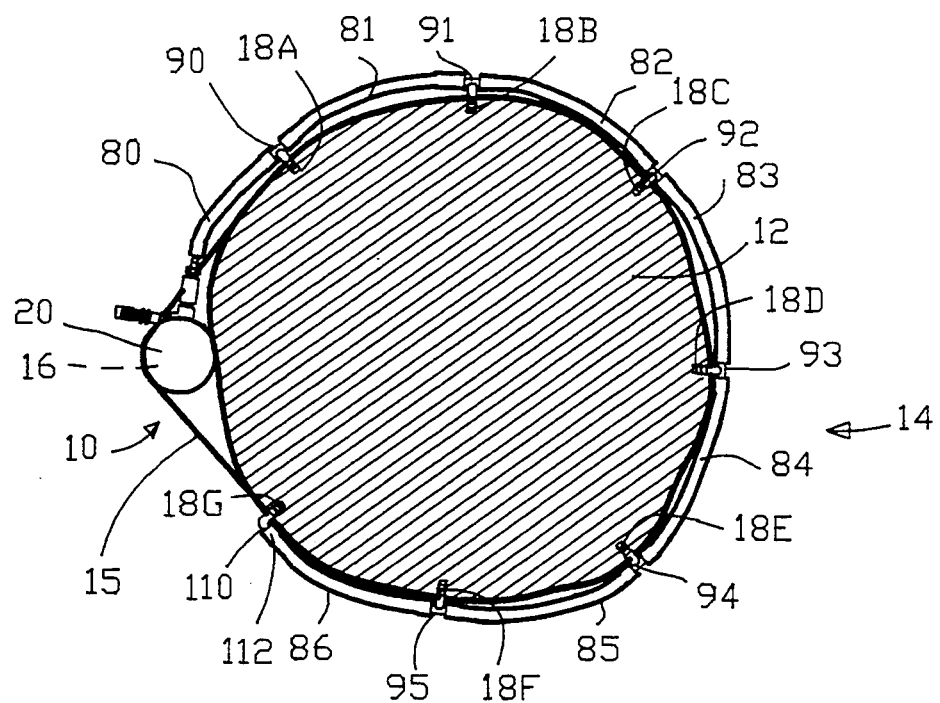
FIG. 2 is an enlarged sectional view along line 2—2 in FIG. 1.

A threaded end 64 of an outer nipple 66 is threadably secured to an output bore 68 of the control valve means 60. The outer nipple 66 includes a tapered end 70 having annular serration 72 intermittently disposed the tapered end 70. The outer nipple 66 receives and frictionally retains a flexible tubing 80. As shown in FIG. 2, flexible tubing comprises flexible tubing segments 80-86 interconnected by a plurality of T fittings 90-95.

Figure 3:
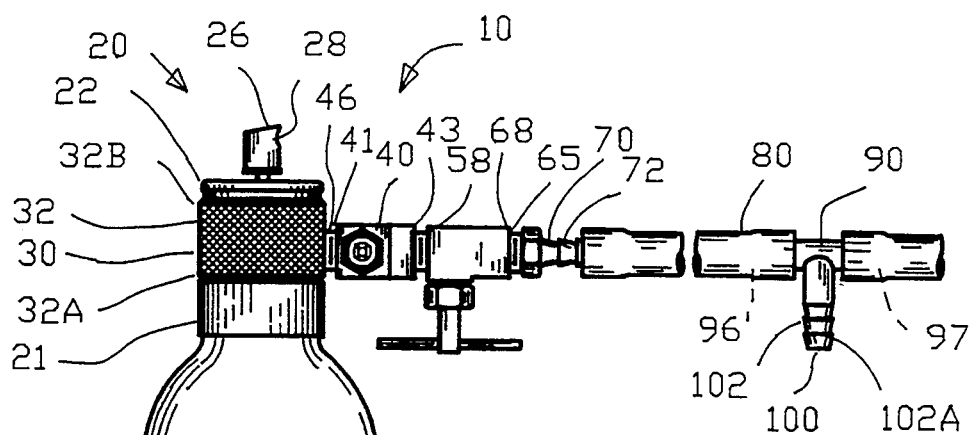
FIG. 3 is an elevational view of the first embodiment of the improved tree injection system of the present invention.
Figure 3A:
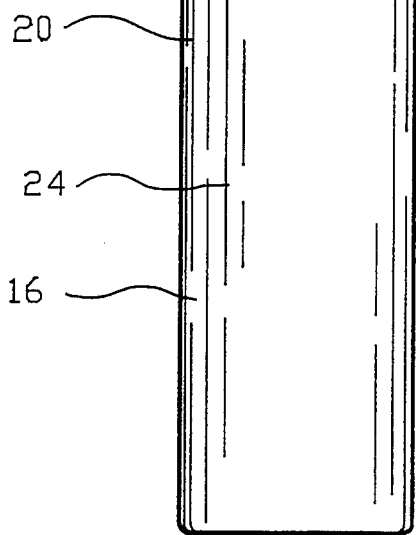
FIG. 3A is a top view of a T fitting of FIG. 3.
Figure 3A:
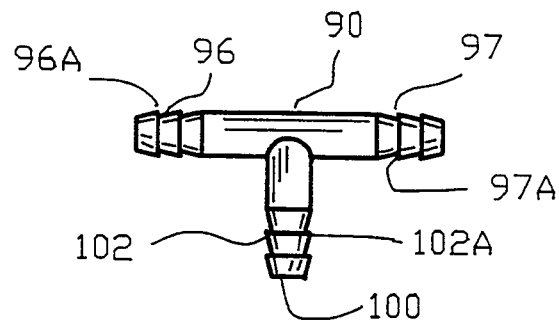
Figure 4:
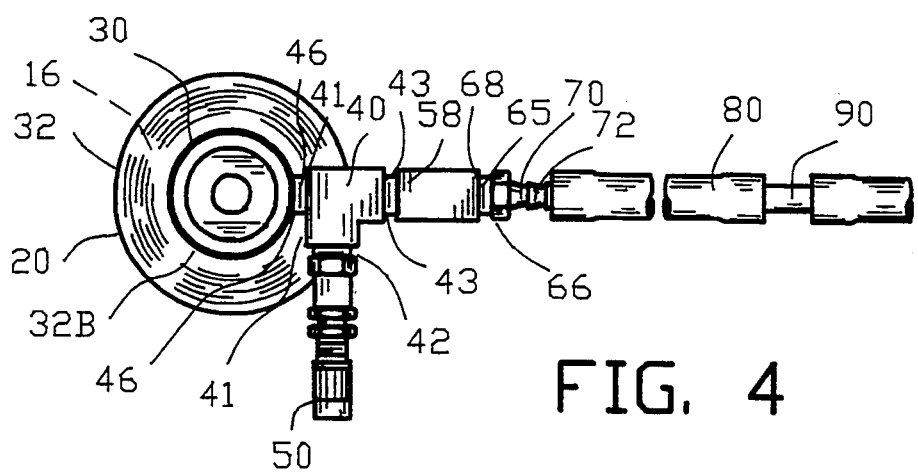
FIG. 4 is a top view of FIG. 3.
Figure 5:
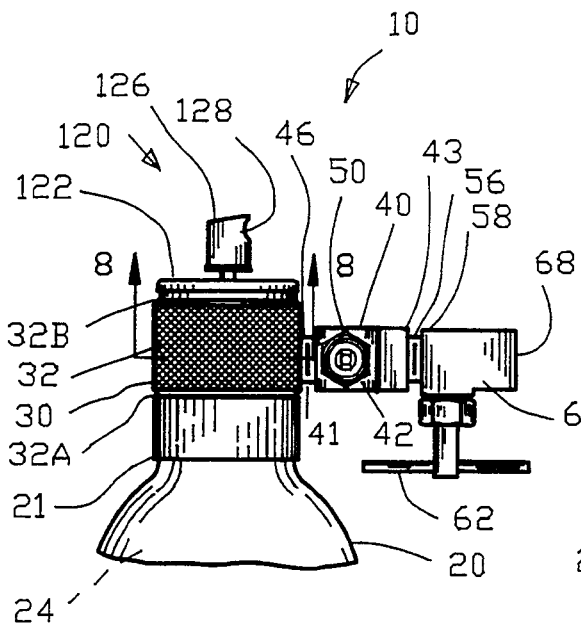
FIG. 5 is an enlarged elevational view of a portion of the first embodiment of the improved tree injection system.

As best shown with reference to FIG. 3A, the T fitting 90 includes opposed tapered ends 96 and 97 having annular serration 96A and 97A intermittently disposed along the tapered end 96 and 97, respectively. An injector nozzle 100 is established perpendicular to the opposed tapered ends 96 and 97. The injector nozzle 100 has an injector tapered end 102 having annular serration 102A. The T fitting 90 provides fluid communication between the opposed tapered ends 96 and 97 and the injector nozzle 100. Preferably, the plurality of T fittings 90-95 are constructed of a rigid material such as a rigid polymeric material.

As shown in FIGS. 1 and 2, the opposed tapered ends 96 and 97 of the plurality T fittings 90-95 frictionally interconnect the flexible tubing segments 80-86. The injector tapered ends 102 of the plurality of T fitting 90 are inserted and are frictionally retained within the holes 18A-18G drilled into the trunk 12 of the tree 14. The injector tapered ends 102 and the annular serration 102A facilitate the insertion of the injector nozzles 100 into the holes 18A-18G drilled into the trunk 12 of the tree 14 and simultaneously inhibit the removal of the injector nozzles 100 therefrom.

A L fitting 110 is connected to a terminal end 112 of the flexible tubing segment 86. Preferably, the L fitting has a tapered end for frictionally connecting to the terminal end 112 of the flexible tubing segments 80-86 and a injector tapered ends 102 for insertion and retention within the hole 18G drilled into the trunk 12 of the tree 14.

A conventional aerosol valve 120 is secured to a mounting cup 122. The aerosol spray valve 120 includes a dip tube 124 and a spray actuator shown as an aerosol button 126 having a terminal orifice 128. The mounting cup 122 is crimped to the annular bead 34 of the closure 30 in a conventional manner.

The improved tree injection system 10 of the present invention is operated in the following manner. First, a plurality of holes such as holes 18A-18G drilled into the trunk 12 of the tree 14. A corresponding number of the T fittings 90-95 and an L fitting 110 are assembled with an appropriate number of flexible tubing segments 80-86. The closure 30 is removed from the container 20 and the container 20 is filled with the treatment liquid 16. The closure 30 is threaded onto the container 20 to close and reseal the container 20. The rotatable handle 62 is rotated to move the control valve means 60 into a closed position.

A pressurized gas from a conventional tire inflation pump or compressor is introduced into the interior 24 of the container 20 through the one-way valve means 50. After the interior 24 of the container 20 is suitably pressurized by the pressurized gas, the improved tree injection system 10 is inverted as shown in FIG. 1 and secured to the trunk 12 of the tree 14 by the fastener 15. The injector nozzles 100 of the T fittings 90-95 and the L fitting 110 are inserted within the holes 18A-18G in the tree 14 to complete the installation process.

The rotatable handle 62 is again rotated to move the control valve means 60 into an open position. The pressurized gas in the interior 24 of the container 20 forces the treatment liquid 16 from the container 20 and through the control valve means 60 into the flexible tubing segments 80-86 to force the treatment liquid 16 from injector nozzles 100 of the T fittings 90-95 into the hole 18A-18G in the tree 14.

If desired, the improved tree injection system 10 may be removed from the trunk 12 of the tree 14 and inverted from the position as shown in FIG. 1 for spraying the treatment liquid 16. The aerosol spray valve 120 and the aerosol button 126 enables the pressurized gas within the interior 24 of the container 20 to spray the treatment liquid 16 from the terminal orifice 128 upon actuation of the aerosol button 126.

FIGS. 9-14 are various views of a second embodiment of the improved tree injection system 210 for injecting a treatment liquid 16 into hole means as the holes 18A-18G of FIGS. 1 and 2. The improved tree injection system 210 comprises the same container 20 having the mounting 21 secured to the container 20 for defining the container opening 22 for filling the interior 24 of the container 20 with the treatment liquid 16. The container mounting 21 includes container threads 226 for threadably engaging with closure threads 228 of a closure 230 for closing the container opening 222.

The closure 230 comprises a cylindrical sidewall 232 with the closure threads 228 being disposed on a lower end 232A of the cylindrical sidewall 232. An end wall 234 is disposed on an upper end 232B of the cylindrical sidewall 232. The cylindrical sidewall 232 and end wall 234 of the closure 230 defines a cylindrical internal volume 236 and a threaded closure aperture 238.

A coupling 240 includes a first, second, third and a fourth threaded aperture 241, 242, 243 and 244 which are in fluid communication internal the coupling 240. The first threaded aperture 241 is connected by an inner threaded nipple 246 to the threaded aperture 238 of the closure 230.

A one-way valve means 250 is threadably connected to the second threaded aperture 242 of the coupling 240. The one-way valve means 250 is shown as a conventional Schrader valve to enable a pressurized gas such as air to be introduced into the interior 24 of the container 20.

An intermediate threaded nipple 256 interconnects the third threaded aperture 243 of the coupling 240 to an input bore 258 of a control valve means 260. The control valve means 260 has a rotatable handle 262 for metering or controlling the flow of fluid therethrough. The control valve means 260 communicates with the interior 24 of the container 20 for controlling the flow of the treatment liquid 16 from the interior 24 of the container 20.

The fourth threaded aperture 244 of the coupling 240 communicates with a gas pressure gauge 263 having an indicating needle 263A and a scale 263B. The gas pressure gauge 263 communicates with the interior 24 of the container 20 through the coupling 240, the inner threaded nipple 246 and the cylindrical internal volume 236 of the closure 230 for enabling the indicating needle 263A and the scale 263B to measure and display the pressure of the pressurized gas 16 in the interior 24 of the container 20.

A threaded end 264 of an outer nipple 266 is threadably secured to an output bore 268 of the control valve means 260. The outer nipple 266 includes a tapered end 270 having annular serration 272 intermittently disposed the tapered end 270. The outer nipple 266 receives and frictionally retains the flexible tubing 80 in a manner similar to FIGS. 1-8.

The improved tree injection system 210 of the present invention is operated in the following manner in a manner similar to FIGS. 1-8. The plurality of holes 18A-18G are drilled into the trunk 12 of the tree 14. The T fittings 90-95 and the L fitting 110 are assembled with the flexible tubing segments 80-86. The closure 230 is removed from the container 20 and the container 20 is filled with the treatment liquid 16 and the closure 230 is again threaded onto the container 20. The rotatable handle 262 is rotated to move the control valve means 260 into a closed position.

A pressurized gas is introduced into the interior 24 of the container 20 through the one-way valve means 250. While the container 20 is being pressurized, the gas pressure gauge 263 measures and displays the pressure of the pressurized gas 16 within the interior 24 of the container 20. After the interior 24 of the container 20 is suitably pressurized as indicated by the gas pressure gauge 263, the improved tree injection system 210 is inverted and secured to the trunk 12 of the tree 14 by the fastener 15 as shown in FIG. 1. The injector nozzles 100 of the T fittings 90-95 and the L fitting 110 are inserted within the holes 18A-18G in the tree 14 to complete the installation process.

The rotatable handle 262 is again rotated to move the control valve means 260 into an open position. The pressurized gas in the interior 24 of the container 20 forces the treatment liquid 16 from the container 20 and through the control valve means 260 into the flexible tubing segments 80-86 to force the treatment liquid 16 from injector nozzles 100 of the T fittings 90-95 into the hole 18A-18G in the tree 14.

In should be appreciated that the quantity and the rate of the injection of the treatment liquid 16 may be varied or controlled by varying either the pressure of the gas in the interior 24 of the container 20 or the degree of the opening of the control valve means 60. Furthermore, the interior of the container may be pressurized while the improved tree injection system is inverted and secured to the trunk 12 of the tree 14 by the fastener 15 as shown in FIG. 1. The gas pressure gauge 263 allows the pressure within the container 20 to be periodically monitored while the improved tree injection system is in use on the trunk 12. The gas pressure gauge 263 will quickly reveal a defective seal in the improved tree injection system resulting in the rapid loss of pressure within the container 20. In addition, the periodically monitoring of the pressure within the container 20 provides an indication of the sap pressure of the tree 14 as well as the rate in which the treatment liquid 16 is being injected into the tree 14.

The present invention provides an improved system for injecting a treatment liquid into a hole drilled into a trunk of a tree which is portable, low cost to purchase and is easy to use. The invention incorporates a pressurized container which is refillable for low cost operation and may be easily pressurize without specialized equipment. The invention is capable of reliably delivering a large or small dosage as well as large or small dosage rates.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved refillable tree injection system for injecting a treatment liquid into a plurality of holes drilled into a trunk of a tree, comprising:

a container having a container opening including container threads for permitting the opening and closing of said container and for filling an interior of said container with the treatment liquid;

a closure having closure threads for threadably engaging with said container threads for removably securing said closure to said container for closing said container opening in said container and for enabling said container to be refilled with the treatment liquid;

a coupling secured to said closure for communicating with said interior of said container through a closure aperture;

one-way valve means secured to said coupling for communicating with said interior of said container when said closure is secured to said container to enable the pressurized gas to be introduced into said interior of said container and for inhibiting the discharge of the pressurized gas therefrom;

said one-way valve means being adapted to receive the pressurized gas from a conventional tire filling adaptor to introduce the pressurized gas into said interior of said container;

control valve means secured to said coupling for communicating with said interior of said container when said closure is secured to said container to control the flow of liquid from said interior of said container;

a flexible tubing having a plurality of injector nozzles for insertion into the plurality of holes in the tree;

said plurality of injector nozzles being spaced along said flexible tubing with each of said injector nozzles having tapered serration means for facilitating the insertion of said injector nozzles into the plurality of holes in the tree and for inhibiting the removal of said plurality of injector nozzles from the plurality of holes in the tree;

means for securing the container to the trunk of a tree in an inverted position with said container opening being disposed in a downward position; and means for connecting said flexible tubing to said control valve means for enabling the pressurized gas within said interior of said container to force the treatment liquid into the plurality of holes in the tree to administer the treatment liquid to the tree at a preselected flow rate;

a spray valve disposed in said closure for communicating with said interior of said container when said closure is secured to said container;

a spray actuator having a terminal orifice secured to said spray valve for enabling said pressurized gas within said interior of said container to spray the treatment liquid from said terminal orifice upon actuation of said spray actuator when said container is removed from the trunk of a tree and the container is disposed in an upright position with said container opening being disposed upwardly; wherein said one-way valve means defines a gas input for enabling the pressurized gas to be introduced into said interior of said container;

said control valve means defining a liquid output for directing the treatment liquid into said flexible tubing;

said gas input being disposed at a substantially perpendicular angle relative to said liquid output for enabling said liquid output to be disposed tangential to the trunk of the tree when said container is secured to the trunk of a tree in said inverted position;

said gas input being disposed substantially perpendicular to the trunk of a tree for facilitating the pressurized gas to be introduced into said interior of said container when said container is secured to the trunk of a tree; and a gas pressure gauge secured to said coupling and communicating with said interior of said container for displaying the pressure of the pressurized gas within said interior of said container when said container is secured to the trunk of a tree in said inverted position.

* * * * *